United States Patent
Kang

(10) Patent No.: US 10,408,202 B2
(45) Date of Patent: Sep. 10, 2019

(54) SWASH PLATE AND METHOD OF MANUFACTURING SWASH PLATE

(71) Applicant: HYUNDAI MOTOR COMPANY, Seoul (KR)

(72) Inventor: Hee Sam Kang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 609 days.

(21) Appl. No.: 15/055,268

(22) Filed: Feb. 26, 2016

(65) Prior Publication Data
US 2017/0130709 A1    May 11, 2017

(30) Foreign Application Priority Data

Nov. 5, 2015 (KR) .................. 10-2015-0155223

(51) Int. Cl.
| | |
|---|---|
| F04B 27/10 | (2006.01) |
| B22D 18/04 | (2006.01) |
| B22D 21/00 | (2006.01) |
| C22C 21/14 | (2006.01) |
| F04B 27/08 | (2006.01) |
| B22D 13/04 | (2006.01) |
| B22D 29/00 | (2006.01) |
| F16H 23/10 | (2006.01) |

(52) U.S. Cl.
CPC .......... *F04B 27/1036* (2013.01); *B22D 13/04* (2013.01); *B22D 18/04* (2013.01); *B22D 21/007* (2013.01); *B22D 29/001* (2013.01); *C22C 21/14* (2013.01); *F04B 27/086* (2013.01); *F04B 27/1054* (2013.01); *F16H 23/10* (2013.01); *F05C 2201/0475* (2013.01); *F05C 2203/06* (2013.01); *F05C 2253/12* (2013.01)

(58) Field of Classification Search
CPC .... F04B 27/1036; F04B 27/086; B22D 13/04; B22D 18/04; C22C 21/14
See application file for complete search history.

(56) References Cited

U.S. PATENT DOCUMENTS

| | | | |
|---|---|---|---|
| 4,307,998 A | 12/1981 | Nakayama et al. | |
| 5,056,417 A | 10/1991 | Kato et al. | |
| 5,541,127 A | 7/1996 | Hoshiko et al. | |
| 6,541,127 B1 * | 4/2003 | Tomikawa | F04B 27/1054 428/621 |

(Continued)

FOREIGN PATENT DOCUMENTS

| | | | | |
|---|---|---|---|---|
| GB | 2270086 A | * | 3/1994 | ........... B23K 35/286 |
| JP | 3251562 B2 | | 1/2002 | |
| JP | 2002249844 A | | 9/2002 | |

(Continued)

OTHER PUBLICATIONS

Extended European Search Report dated Mar. 30, 2017 issued in European Patent Application No. 16158743.1.

(Continued)

*Primary Examiner* — George Wyszomierski
*Assistant Examiner* — Janell C Morillo
(74) *Attorney, Agent, or Firm* — Morgan, Lewis & Bockius LLP

(57) ABSTRACT

A swash plate includes 34.5 to 43.0 wt % of copper (Cu) and 0.5 to 2.8 wt % of silicon (Si), with a remainder of aluminum (Al) and other inevitable impurities.

12 Claims, 4 Drawing Sheets

(56) References Cited

U.S. PATENT DOCUMENTS

2003/0106425 A1    6/2003   Kuribara

FOREIGN PATENT DOCUMENTS

| | | |
|---|---|---|
| JP | 2008-114254 A | 5/2008 |
| JP | 10-2012-0102865 A | 9/2012 |
| JP | 5691477 B2 | 4/2015 |
| KR | 10-2001-0099642 A | 11/2001 |
| KR | 10-2005-0076251 A | 7/2005 |
| KR | 10-2010-0049722 A | 5/2010 |
| KR | 10-2012-0102865 A | 9/2012 |

OTHER PUBLICATIONS

Korean Office Action issued in corresponding Korean Patent Application No. 10-2015-0155223, dated Jul. 19, 2017.

* cited by examiner

SWASH PLATE AND METHOD OF MANUFACTURING SWASH PLATE

CROSS REFERENCE TO RELATED APPLICATION

The present application claims the benefit of priority to Korean Patent Application No. 10-2015-0155223, filed on Nov. 5, 2015 with the Korean Intellectual Property Office, the entire contents of which is incorporated herein for all purposes by this reference.

TECHNICAL FIELD

The present disclosure relates to a swash plate suitable for use in a fixed or variable air-conditioning compressor and a method of manufacturing the swash plate and, more particularly, to a swash plate and a method of manufacturing the swash plate, in which the swash plate has superior physical properties, including high strength and wear resistance and reduced weight.

BACKGROUND

Generally, a swash plate-type compressor suitable for an air-conditioning system for a vehicle is used such that a gaseous refrigerant, which is discharged at a low pressure from an evaporator, is compressed at a high pressure so as to be readily liquefied, and is then fed into a condenser.

The inside of the swash plate-type compressor is provided with a piston that compresses the refrigerant in the compression chamber of the compressor while performing reciprocal movement due to the rotation of the swash plate.

The swash plate, which rotates in a state of being inclined relative to the drive shaft, is configured such that the sliding surface thereof is in contact with the shoe of the piston, and thus the piston is reciprocally moved in the bore of a cylinder when the swash plate is rotated.

Therefore, the swash plate has to possess lubricating properties on the sliding surface that is in contact with the shoe, as well as mechanical properties including wear resistance.

Materials for the swash plate are largely classified into hypereutectic aluminum alloys, copper alloys, and cast iron.

The hypereutectic aluminum-silicon alloy for use in a fixed air-conditioning compressor is manufactured in a manner in which silicon particles are fined at a high cooling rate in the continuous casting process, and then forged. In order to increase the surface lubricating properties, a self-lubricating tin (Sn) coating process is applied.

For reference, the self-lubricating coating process is a coating technique using a material that reduces friction resistance even without the use of a friction material.

However, the hypereutectic aluminum-silicon alloy is expensive compared to typical aluminum products because continuous casting and forging is carried out, rather than typical gravity casting or sand casting due to the difficulty in controlling the size of silicon particles. Also, the seizure stress of the hypereutectic aluminum-silicon alloy is less than half that of the copper alloy or cast iron, making it difficult to apply the hypereutectic aluminum-silicon alloy to variable air-conditioning compressors which are subjected to high surface pressure and severe driving conditions.

In addition, the copper alloy and cast iron may be used as material for the swash plate for use in a variable air-conditioning compressor.

These two materials have superior mechanical properties, wear resistance, and seizure stress, and are thus currently applied to almost all variable air-conditioning compressors.

However, the copper alloy is expensive compared to conventional cast iron material or aluminum forged material, and the cast iron material suffers from the same seizure problems when driven because the sliding surface is made of the same material as in the shoe that comes into contact therewith, and a special resin coating must be essentially provided at the interface therebetween.

In consideration thereof, there is a need to develop a swash plate using a novel aluminum alloy, which is inexpensive and enables greater processing freedom compared to conventional hypereutectic aluminum-silicon alloys but exhibits wear resistance and seizure stress equal to or superior to those of copper alloys or cast iron materials.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems encountered in the related art, and an object of the present disclosure is to provide a swash plate, made of an aluminum alloy that is lightweight and has strength and wear resistance equal to or higher than conventional copper alloys, and a method of manufacturing the same.

An embodiment of the present disclosure provides a swash plate, comprising: 34.5 to 43.0 wt % of copper (Cu) and 0.5 to 2.8 wt % of silicon (Si), with the remainder of aluminum (Al) and other inevitable impurities.

The swash plate preferably includes a plurality of core pin holes, the core pin holes being formed toward the center along the outer circumferential surface thereof.

The core pin holes may have a diameter of ½ or less of a thickness of the swash plate.

The swash plate may have a primary $Al_2Cu$ phase and an Al—$Al_2Cu$ lamella structure.

The swash plate may have a primary $Al_2Cu$ phase fraction of 10 to 50 vol % and an elastic modulus of 120 GPa or more.

The swash plate preferably has a tensile strength of 400 MPa or more and a castability evaluation factor (C) of 2.0 or more, as defined by Equation 1 below:

$$\text{Castability evaluation factor } (C) = \text{liquidus temperature } (K)/\{\text{liquidus temperature } (K)-(\text{quantity of heat } (Q) \times \text{composition } (F))\} \quad \text{Equation 1:}$$

Another embodiment of the present disclosure provides a method of manufacturing a swash plate, comprising: preparing an aluminum alloy melt comprising 34.5 to 43.0 wt % of copper (Cu) and 0.5 to 2.8 wt % of silicon (Si), with the remainder of aluminum (Al) and other inevitable impurities; casting the aluminum alloy melt using a mold having a plurality of core pins; and removing the core pins from the mold and separating the swash plate from the mold.

The casting may be performed through gravity casting or centrifugal casting.

The casting is preferably performed at a temperature of 595 to 625° C., and the core pins may have a thickness of ½ or less of a thickness of the swash plate.

The swash plate may have a primary Al$_2$Cu phase fraction of 10 to 50 vol % and an elastic modulus of 120 GPa or more.

The swash plate preferably has a tensile strength of 400 MPa or more and a castability evaluation factor (C) of 2.0 or more, as defined by Equation 1 below:

Castability evaluation factor (C)=liquidus temperature (K)/{liquidus temperature (K)−(quantity of heat (Q)×composition (F))}  Equation 1:

According to embodiments of the present disclosure, aluminum (Al) is added with an excess of copper (Cu) and silicon (Si), thus forming a primary phase (Al$_2$Cu) and a lamella structure, thereby ensuring tensile strength and elasticity equal to or superior to those of conventional copper alloys.

Also, overlays can be removed using core pins in the casting process, thereby realizing lightweight products.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
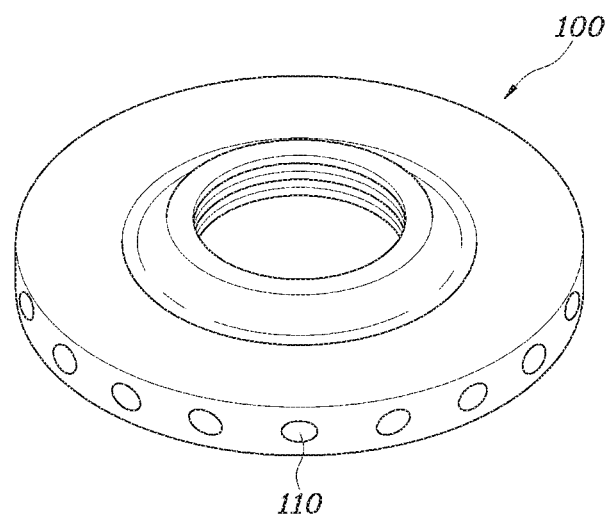
FIG. 1 illustrates a swash plate according to an embodiment of the present disclosure.

Hereinafter, a detailed description will be given of preferred embodiments of the present disclosure with reference to the appended drawings, but such embodiments are not to be construed as limiting the present disclosure. Throughout the drawings, the same reference numerals refer to the same or like parts, and may be described with reference to contents depicted in the other drawings. Furthermore, descriptions which are deemed to be readily apparent to those skilled in the art or repetitive may be omitted.

According to an embodiment of the present disclosure, a swash plate 100 may be composed mainly of Al and includes 34.5 to 43.0 wt % of Cu, 0.5 to 2.8 wt % of Si, and other inevitable impurities.

The aluminum alloy according to the present disclosure may be different from the hypereutectic aluminum alloy used for a conventional swash plate because it includes a Cu content of 34.5 wt % or more and a Si content of 0.5 to 2.8 wt %, which is notably lower than the 12.6 wt % or more of Si in the conventional hypereutectic aluminum alloy.

Therefore, both wear resistance and high strength required for the swash plate may be satisfied.

More specifically, the Cu content of the swash plate according to the present disclosure may be preferably set within the range of 34.5 to 43.0 wt %.

If the Cu content is less than 34.5 wt %, the elastic modulus of 120 GPa or more may not be not ensured. In contrast, if the Cu content exceeds 43.0 wt %, the primary Al$_2$Cu phase corresponding to an intermetallic compound may be formed in an amount of 50% or more in the microstructure, and thus the properties of the intermetallic compound may be exhibited, undesirably incurring problems related to brittleness and processability and making it impossible to apply the resultant aluminum alloy to a swash plate.

Meanwhile, Si may be added to enhance the strength of the aluminum alloy, which may contain an excess of Cu. When the Si content falls in the range of 0.5 to 2.8 wt %, a tensile strength of 400 to 550 MPa may be ensured. If the Si content is less than 0.5 wt % or exceeds 2.8 wt %, a tensile strength of less than 400 MPa may result, making it impossible to ensure high strength.

Hence, the Si content is preferably set within the range from 0.5 to 2.8 wt %.

FIG. 1 illustrates the swash plate 100 according to an embodiment of the present disclosure. As illustrated in FIG. 1, the swash plate according to the embodiment of the present disclosure may be configured such that a plurality of core pin holes 110 is formed toward the center along the outer circumferential surface thereof.

The diameter of the core pin holes is preferably set to ½ or less of the thickness of the swash plate. If the diameter of the core pin holes, which are formed to realize lightweightness, exceeds ½ of the thickness of the swash plate, structural stability may not be ensured. The plurality of core pin holes is disposed radially toward the center along the outer circumferential surface of the swash plate, and the maximum number thereof may be 36 (such that the angle defined between adjacent core pin holes=10°).

The number of core pin holes may fall in the range of 2 to 36, and the diameter thereof may be ½ or less of the thickness of the swash plate, and the angle defined between adjacent core pin holes may be in the range of 10 to 180°.

Figure 2:
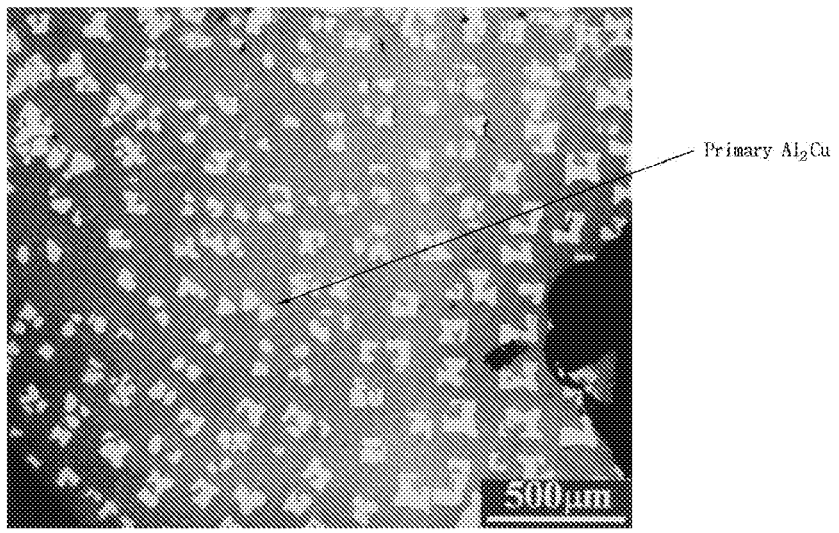
FIG. 2 illustrates a microstructure of the swash plate according to an embodiment of the present disclosure.
Figure 3:
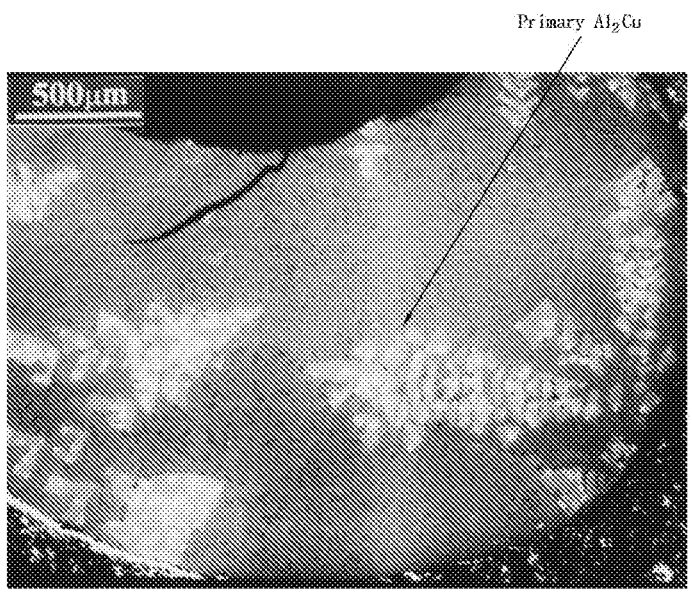
FIG. 3 illustrates the agglomeration and coarse growth of primary Al$_2$Cu phase in the microstructure of an aluminum alloy having a Cu content that exceeds 43.0 wt %.

FIG. 2 illustrates a microstructure of the swash plate according to an embodiment of the present disclosure, and FIG. 3 illustrates an agglomeration and coarse growth of primary Al$_2$Cu phase in the microstructure of the aluminum alloy having a Cu content that exceeds 43.0 wt %.

As illustrated in FIGS. 2 and 3, when the swash plate according to an embodiment of the present disclosure comprises 34.5 to 43.0 wt % of Cu and 0.5 to 2.8 wt % of Si, the primary Al$_2$Cu phase may be uniformly formed so as to have a phase fraction of 10 to 50 vol %, thereby ensuring superior elastic modulus and tensile strength. If the Cu content exceeds 43.0 wt %, agglomeration and coarse growth may occur, thus causing brittleness of the material and deteriorating processability (i.e. potentially damaging tools).

In addition, a method of manufacturing the swash plate according to an embodiment of the present disclosure may include preparing an aluminum alloy melt, casting the aluminum alloy melt to form a swash plate, and separating the swash plate from a mold.

In the preparation step, the aluminum alloy melt preferably comprises 34.5 to 43.0 wt % of Cu, and 0.5 to 2.8 wt % of Si, with the remainder of Al and other inevitable impurities.

TABLE 1

| | Cu content (wt %) | Elastic modulus (GPa) | Primary Al$_2$Cu phase fraction (vol %) |
|---|---|---|---|
| C. Ex. 1 | 33 | — | 0 |
| C. Ex. 2 | 34 | 119 | 5 |
| Ex. 1 | 35 | 123 | 10 |
| Ex. 2 | 37 | 130 | 20 |
| Ex. 3 | 39 | 137 | 30 |
| Ex. 4 | 41 | 145 | 40 |
| Ex. 5 | 43 | 154 | 50 |
| C. Ex. 3 | 45 | 163 | 60 |

Figure 4:
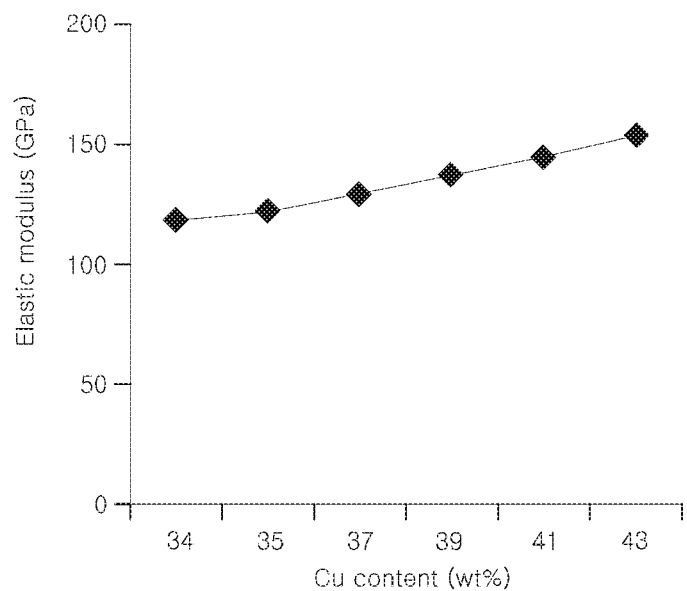
FIG. 4 is a graph illustrating changes in an elastic modulus depending on the Cu content.

Table 1 shows the primary Al$_2$Cu phase fraction and elastic modulus depending on the Cu content, in the examples and comparative examples. FIG. 4 is a graph illustrating changes in the elastic modulus depending on the Cu content, and FIG. 5 is a graph illustrating changes in the primary Al$_2$Cu phase fraction depending on the Cu content.

Figure 5:
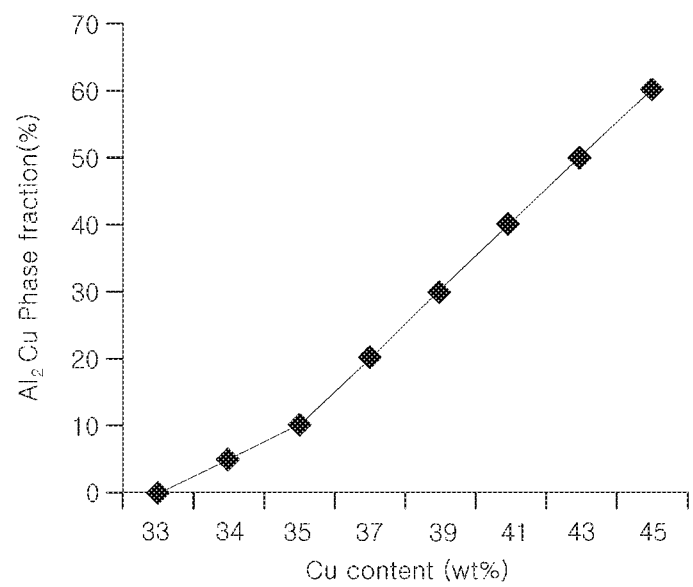
FIG. 5 is a graph illustrating a primary Al$_2$Cu phase fraction depending on the Cu content.

As shown in Table 1 and FIGS. 4 and 5, if the Cu content is less than 34.5 wt %, the primary Al$_2$Cu phase fraction is decreased, and thus the elastic modulus may be less than 120 GPa, which does not satisfy the required elastic modulus. In contrast, if the Cu content exceeds 43 wt %, the primary Al$_2$Cu phase fraction is greater than 50%, thus causing agglomeration and coarse growth thereof, undesirably resulting in brittleness and poor processability. Hence, the Cu content may be set within the range from 34.5 to 43 wt %.

TABLE 2

| | Si content (wt %) | Tensile strength (MPa) |
|---|---|---|
| C. Ex. A | 0 | 65 |
| Ex. A | 0.5 | 540 |
| Ex. B | 1.0 | 540 |
| Ex. C | 1.5 | 500 |
| Ex. D | 2.0 | 470 |
| Ex. E | 2.5 | 430 |
| C. Ex. B | 3.0 | 380 |
| C. Ex. C | 4.0 | 260 |

Figure 6:
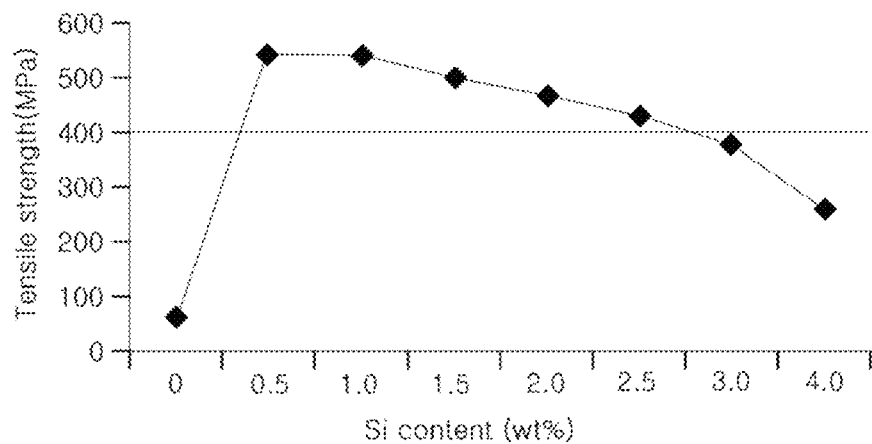
FIG. 6 is a graph illustrating changes in a tensile strength depending on the Si content.

Table 2 shows changes in tensile strength depending on the Si content in the examples and comparative examples, and FIG. 6 is a graph illustrating changes in tensile strength depending on the Si content.

As is apparent from Table 2 and FIG. 6, when the Si content falls in the range from 0.5 to 2.8 wt %, superior tensile strength of 400 MPa or more may be ensured. In contrast, if the Si content is less than 0.5 wt % or exceeds 2.8 wt %, tensile strength may be drastically reduced to a level lower than 400 MPa. Hence, the Si content is preferably set within the range from 0.5 to 2.8 wt %.

After the preparation of the aluminum alloy melt, the swash plate may be formed through casting. The casting process according to an embodiment of the present disclosure is preferably gravity casting or centrifugal casting. Alternatively, a sand casting process may be applied.

Since the aluminum alloy melt used in the method of manufacturing the swash plate according to the present disclosure may have a low liquidus temperature of 550 to 575° C. compared to conventional hypereutectic aluminum alloys, coarse growth of the microstructure may not readily occur with a decrease in cooling rate, and thus gravity casting or high-pressure casting may be applied.

In the present disclosure, the casting process is preferably carried out at a temperature of 595 to 625° C.

The liquidus temperature of the aluminum alloy melt used in the present disclosure may be a maximum of 575° C. In order to ensure fluidity of the melt, the casting process is preferably performed at a minimum of 595° C., which is at least 20° C. higher than the liquidus temperature.

If the casting temperature is more than 50° C. higher than the liquidus temperature, the size of the resulting primary Al$_2$Cu phase may increase, and the high strength and wear resistance of the product may deteriorate due to the generation of pores by the hydrogen gas. Hence, the casting temperature is preferably set to a range of 595 to 625° C.

TABLE 3

| | Al (wt %) | Cu (wt %) | Liquidus Temp. K (° C.) | Heat capacity (J/gK) | Latent heat (J/g) | Quantity of heat Q (Latent heat/Heat capacity) | Composition F (Cu/Al) | Castability evaluation factor C |
|---|---|---|---|---|---|---|---|---|
| C. Ex. 1 | 67 | 33 | 545 | 0.733 | 381 | 520 | 0.49 | 1.89 |
| C. Ex. 2 | 66 | 34 | 550 | 0.728 | 381 | 523 | 0.52 | 1.96 |
| Ex. 1 | 65 | 35 | 554 | 0.723 | 381 | 527 | 0.54 | 2.05 |
| Ex. 2 | 63 | 37 | 556 | 0.713 | 381 | 534 | 0.59 | 2.31 |
| Ex. 3 | 61 | 39 | 567 | 0.702 | 381 | 543 | 0.64 | 2.58 |
| Ex. 4 | 59 | 41 | 574 | 0.693 | 380 | 548 | 0.69 | 2.59 |
| Ex. 5 | 57 | 43 | 580 | 0.682 | 380 | 557 | 0.75 | 3.63 |
| C. Ex. 3 | 55 | 45 | 587 | 0.672 | 380 | 565 | 0.82 | 4.72 |

Figure 7:
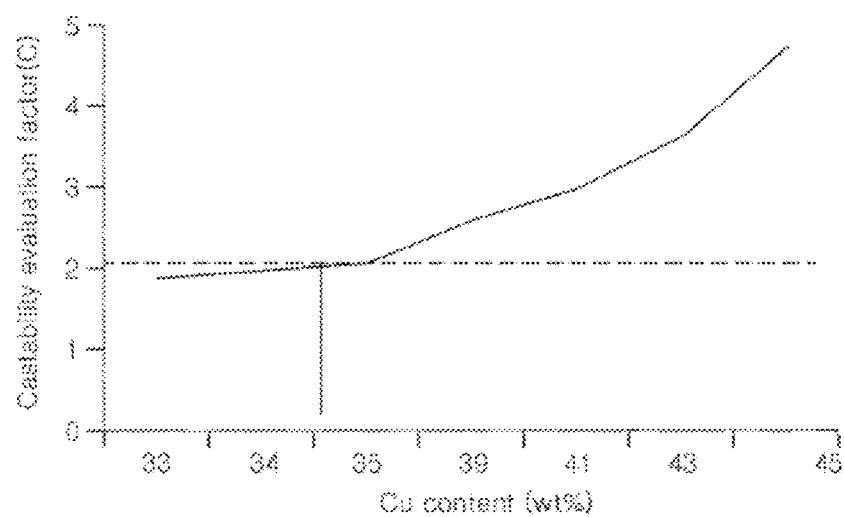
FIG. 7 is a graph illustrating a castability evaluation factor (C) depending on the Cu content.

Table 3 shows the results of calculation of the castability evaluation factor in the examples and comparative examples, and FIG. 7 is a graph illustrating the castability evaluation factor (C) depending on the Cu content.

The castability evaluation factor (C) is calculated by the following Equation 1.

$$\text{Castability evaluation factor }(C) = \text{liquidus temperature }(K)/\{\text{liquidus temperature }(K) - (\text{quantity of heat }(Q) \times \text{composition }(F))\} \quad \text{Equation 1:}$$

As is apparent from Table 3 and FIG. 7, the castability evaluation factor according to the examples of the present disclosure may be as high as 2.0 or more, and the agglomeration and coarse growth of the resulting primary Al$_2$Cu phase may be prevented from occurring, thereby ensuring high strength and wear resistance and exhibiting superior processability.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A swash plate, comprising:
34.5 to 43.0 wt % of copper (Cu) and 0.5 to 2.8 wt % of silicon (Si), with a remainder of aluminum (Al) and other inevitable impurities,
wherein the swash plate has a tensile strength of 400 MPa or more.

2. The swash plate of claim 1, wherein the swash plate includes a plurality of core pin holes, the core pin holes being formed toward a center along an outer circumferential surface thereof.

3. The swash plate of claim 2, wherein the core pin holes comprise a diameter of ½ or less of a thickness of the swash plate.

4. The swash plate of claim 1, wherein the swash plate has a primary $Al_2Cu$ phase and an $Al$—$Al_2Cu$ lamella structure.

5. The swash plate of claim 4, wherein the swash plate has a primary $Al_2Cu$ phase fraction of 10 to 50 vol % and an elastic modulus of 120 GPa or more.

6. The swash plate of claim 1, wherein the swash plate has a tensile strength of 400 MPa or more and a castability evaluation factor (C) of 2.0 or more, as defined by Equation 1 below:

Castability evaluation factor (C)=liquidus temperature (K)/{liquidus temperature (K)−(quantity of heat (Q)×composition (F))}.   Equation 1:

7. A method of manufacturing a swash plate, comprising:
preparing an aluminum alloy melt comprising 34.5 to 43.0 wt % of copper (Cu) and 0.5 to 2.8 wt % of silicon (Si), with a remainder of aluminum (Al) and other inevitable impurities;
casting the aluminum alloy melt using a mold having a plurality of core pins; and
removing the core pins from the mold and separating the swash plate from the mold and wherein the swash plate has a tensile strength of 400 MPa or more.

8. The method of claim 7, wherein the casting is performed through gravity casting or centrifugal casting.

9. The method of claim 7, wherein the casting is performed at a temperature of 595 to 625° C.

10. The method of claim 7, wherein the core pins have a thickness of ½ or less of a thickness of the swash plate.

11. The method of claim 7, wherein the swash plate has a primary $Al_2Cu$ phase fraction of 10 to 50 vol % and an elastic modulus of 120 GPa or more.

12. The method of claim 7, wherein the swash plate has a tensile strength of 400 MPa or more and a castability evaluation factor (C) of 2.0 or more, as defined by Equation 1 below:

Castability evaluation factor (C)=liquidus temperature (K)/{liquidus temperature (K)−(quantity of heat(Q)×composition (F))}.   Equation 1:

* * * * *